US005463424A

United States Patent [19]

Dressler

[11] Patent Number: 5,463,424

[45] Date of Patent: Oct. 31, 1995

[54] MULTI-CHANNEL TRANSMITTER/RECEIVER SYSTEM PROVIDING MATRIX-DECODING COMPATIBLE SIGNALS

[75] Inventor: Roger W. Dressler, Danville, Calif.

[73] Assignee: Dolby Laboratories Licensing Corporation, San Francisco, Calif.

[21] Appl. No.: 102,072

[22] Filed: Aug. 3, 1993

[51] Int. Cl.[6] .................................................... H04N 5/60

[52] U.S. Cl. ................................ 348/485; 381/22; 381/30

[58] Field of Search .................................... 348/462, 484, 348/485, 738; 381/18, 19, 20, 21, 22, 23, 30, 31, 2, 6, 14; H04N 5/60

[56] References Cited

U.S. PATENT DOCUMENTS

| | | | |
|---|---|---|---|
| 4,115,666 | 9/1978 | Ogura | 179/100.45 T |
| 4,152,542 | 5/1979 | Cooper | 381/22 |
| 4,577,305 | 3/1986 | Allen et al. | 369/86 |
| 4,710,814 | 12/1987 | Gassmann et al. | 348/485 |
| 5,042,069 | 8/1991 | Chhatwal et al. | 381/30 |
| 5,105,463 | 4/1992 | Veldhuis et al. | 381/30 |
| 5,214,741 | 5/1993 | Akamine et al. | 381/30 |
| 5,278,909 | 1/1994 | Edgar | 381/18 |
| 5,291,557 | 3/1994 | Davis et al. | 381/22 |

FOREIGN PATENT DOCUMENTS

| | | | |
|---|---|---|---|
| 0084125 | 7/1983 | European Pat. Off. | H04J 6/00 |
| 9009022 | 8/1990 | WIPO | H04B 1/66 |
| 9114310 | 9/1991 | WIPO | H03H 17/03 |
| 9212608 | 7/1992 | WIPO | H04S 3/00 |
| 9212607 | 7/1992 | WIPO | H04B 1/66 |

OTHER PUBLICATIONS

Julstrom, "A High–Performance Surround Sound Process for Home Video," Jul./Aug. 1987, pp. 536–549.

ten Kate, et al., "A New Surround–Stereo–Surround Coding Technique," May 1992, pp.376–383.

Theile, et al., "MUSICAM–Surround: A Universal Multi–Channel Coding System Compatible with ISO 11172–3," Oct. 1992, preprint 3403.

Gerzon, "Psychoacoustic Decoders for Multispeaker Stereo and Surround Sound," Oct. 1992, preprint 3406.

Stoll, et al., "Extension of ISO/MPEG–Audio Layer II to Multi–Channel Coding:," Mar. 1993, preprint 3550.

*Studio Sound,* Fox, Business Column, May 1993, p. 57.

*Primary Examiner*—James J. Groody

*Assistant Examiner*—Jeffrey S. Murrell

*Attorney, Agent, or Firm*—Thomas A. Gallagher; David N. Lathrop

[57] ABSTRACT

The invention relates generally to transmitting and receiving multiple channels of information, particularly audio information which represents a multidimensional sound field. More particularly, the invention relates to devices and methods which provide signals that are compatible with multichannel receivers and with matrix decoders such as the decode MP-Matrix used for many motion picture soundtracks. In a multi-channel transmitter, a network prepares intermediate signals which are encoded by signal analysis processors into a signal for subsequent transmission or storage. In a multi-channel receiver, information extracted from the received encoded signal is combined in a network and processed by signal synthesis processors to provide output signals which are compatible with a matrix decoder.

25 Claims, 6 Drawing Sheets

MULTI-CHANNEL TRANSMITTER/RECEIVER SYSTEM PROVIDING MATRIX-DECODING COMPATIBLE SIGNALS

TECHNICAL FIELD

The present invention relates in general to an apparatus and a method for multi-channel encoding and decoding. In particular, in a system delivering discrete multi-channel signals, the present invention provides for the encoding of signals which are compatible with both matrix decoders and discrete multi-channel decoders.

BACKGROUND ART

There is considerable interest in the field of audio signal processing to provide for systems which can efficiently deliver multiple channels of audio information. Systems which have more than one channel are attractive because they are capable of presenting more realistic three-dimensional sound fields than systems with only one channel. Within some limits, the ability to accurately reproduce three-dimensional sound fields increases as the number of channels increases. For example, some motion picture playback systems use four or more channels to reproduce a motion picture soundtrack. Current motion picture standards for future systems include five full-bandwidth channels and a sixth narrow-bandwidth channel for low-frequency effects. It is expected that soundtracks with four or more channels will be carried by video cassette tapes and optical discs as well. Proposed standards for Advanced Television (ATV) and High-Definition Television (HDTV) also include specifications for similar audio systems.

One- and Two-channel Media

Despite the dimensional superiority of systems with three or more channels, the most common playback systems have only one or two channels. Playback systems with three or more channels are not as common because they are relatively expensive and because there are very few media available to deliver more than two channels of high-quality audio information. The most common media, such as motion picture soundtracks, radio and television broadcast signals, magnetic tapes and phonograph records, usually provide either a one-channel format or a two-channel format.

Matrix encoding is one technique commonly used to provide three or more playback channels in spite of the two-channel media limitation. According to this technique, signals from several "source channels" are combined into signals carried by one or two "transmission channels," which are subsequently decoded into signals played back over several "presentation channels." Throughout this discussion mention is made of encoded signals which are transmitted, but it should be understood that the discussion also applies to encoded signals which are stored for subsequent use. Reference to transmitters and receivers should be understood to also include reference to encoders and decoders, as appropriate.

The way in which the source channel signals are combined is prescribed by an encoding matrix. The encoding matrix is designed in such a way that the transmission channel signals are compatible with conventional one- and two-channel playback systems.

In motion picture soundtracks, for example, a 4-2-4 encode/decode matrix combines four source channel signals, commonly denoted as Left (L), Right (R), Center (C) and Surround (S), into two transmission channel signals carried by the two-track film soundtrack, denoted Left-total (Lt) and Right-total (Rt). The Lt/Rt signals are matrix decoded to recover four signals, denoted L', R', C' and S', which are played back over four presentation channels. The prime (') notation indicates that the recovered information generated by dematrixing is not identical to the information received from the source channels. The particular matrix used in many motion picture soundtrack applications is referred to as the MP-Matrix.

The two Lt/Rt signals encoded by the MP-Matrix are compatible with one- and two-channel playback systems. In one-channel systems, the two film soundtracks are automatically combined optically into one signal which may be sent directly to a monophonic presentation channel. In two-channel systems, the Lt/Rt signals may be sent directly to the two Left/Right presentation channels. In either system, the signal or signals recovered from the soundtrack generate a sound field which is frequently very similar to the sound field that would have been created by playing back the source channel signals over the same playback system.

Similar compatibility is provided in radio and television broadcasting, for example, even though a slightly different matrix is used. In many broadcast applications, a 4-2-4 encoded/decode matrix combines four source channels into sum (Lt+Rt) and difference (Lt−Rt) channels. One-channel receivers detect only the sum channel which is compatible with one-channel playback. Two-channel receivers detect both channels so that the Lt/Rt signals may be recovered. The Lt/Rt signals are compatible with two-channel playback and may also be dematrixed into four channels as described above. In either system, the resulting sound field is very similar to the sound field that would have been created by playing back the source channels over the same playback system.

The major difference between the two sound fields is a consequence of a relative phase shift introduced into the S channel signal. This phase shift, which is discussed in more detail below, allows conventional two-channel playback systems to reproduce the S channel signals with a more diffused sound image than the other channel signals. This result is usually intended for the S channel. The compatibility between the MP-Matrix Lt/Rt signals and conventional two-channel reproduction is well established; thousands of motion pictures with MP-Matrix encoded sound tracks have been released for playback through MP-Matrix decoders as well as conventional two-channel systems.

MP-Matrix Encoding

In an MP-Matrix encoder, the L and R channel signals are passed unaltered and the C channel signal is summed into the Lt and Rt channel signals at an attenuated level to preserve its acoustic power. In analog systems, an MP-Matrix encoder subjects the S channel signal to band-pass filtering, frequency shaping to improve system tolerance of transmission errors, and phase shifting. Because these types of transmission path errors are avoided in digital systems, the filtering and frequency shaping are not required for digital implementations. Two S channel signal components are generated, shifted in phase ±90 degrees relative to the other channels. The phase shifts are applied to reduce the likelihood that front channel and S channel signals are correlated. This coding may be expressed as $$Lt=L+0.707 \cdot C+0.707 \cdot jS \tag{1a}$$

$$Rt=R+0.707.C-0.707.jS \qquad (1b)$$

where jS denotes the S channel signal shifted in phase by 90 degrees.

One typical method for shifting the phase of analog or digital signals is to pass the L, R and C channels signals through one type of all-pass filter, and to pass the S channel signal through a second type of all-pass filter. Each of these filters may introduce thousands of degrees of phase rotation over the frequency range, but the differential phase between the two filters is fixed at substantially 90 degrees. A second S channel component shifted in phase by −90 degrees is obtained by simply inverting the other phase-shifted S channel component. The phase of the two S channel components are 180 degrees apart and ±90 degrees from the L, C, and R channel signals.

Another method for obtaining a 90-degree phase shift in digital signals is to apply a Hilbert transform. The cost of implementing the Hilbert transform becomes increasingly attractive as the cost of digital signal processing decreases. An added benefit is that only the S channel signal needs to be processed, yielding the desired 90-degree phase relationship directly. Although the audible effects of the all-pass filters discussed above are usually negligible, the elimination of these effects is desirable because it enhances system transparency.

Future Media and Systems

Future audio coding standards promise to remove the two-channel media limitation, greatly improving the delivery of multiple channels of audio information. "Split-band" coding is a technique which may be easily used with such media in single- and multi-channel coding applications. Split-band coding techniques can produce high-quality encoded signals at low bit rates by using an analysis filter bank to divide source channel signals into frequency subband signals and adaptively quantizing each subband signal according to psychoacoustic principles. A replica of the source channel signals is recovered by using a complementary synthesis filter bank. Two split-band techniques known as subband coding and transform coding are discussed in Tribolet and Crochiere, "Frequency Domain Coding of Speech," *IEEE Trans. Acoust., Speech, and Signal Proc.*, vol ASSP-27, October 1979, pp. 512–30. Subband coding may implement the filter banks with digital or analog filters. Transform coding implements the filter banks with so-called time-domain-to-frequency-domain transforms One example of multi-channel transform coding is described in WIPO publication number WO 92/12607, published Jul. 23, 1992, which is incorporated herein by reference in its entirety. According to this disclosure, a transmitter encodes multiple source channel signals into an encoded signal which may be transmitted efficiently; a receiver decodes the encoded signal into multiple presentation channel signals. In one embodiment for motion picture soundtrack applications, a coding system provides six presentation channels.

Two-Channel Receivers

Current trends suggest that media such as HDTV or ATV broadcast channels, compact discs and magnetic tape will carry five or more channels of audio information. Nevertheless, it is anticipated that manufacturers will want to build split-band receivers with only one or two presentation channels in order to offer low-cost products. For example, an ATV manufacturer may want to offer low-cost two-channel receivers to the television viewers unwilling to pay the higher cost for more complex playback systems, and offer higher-cost receivers with more channels to other viewers.

Unfortunately, many high-quality split-band coding systems have high implementation costs. Much of the cost is incurred implementing the filter banks. The cost of implementing a split-band transmitter is approximately proportional to the number of source channels. The cost of many implementations of receivers is also proportional to the number of source channels.

Fortunately, the implementation cost of a split-band receiver can be reduced to an amount approximately proportional to the number of presentation channels by using techniques set forth in WIPO publication number WO 92/12608, published Jul. 23, 1992. This publication is incorporated herein by reference in its entirety. For example, the cost of implementing a two-channel receiver can be reduced to approximately one-third the cost of implementing a six-channel receiver.

Even with receivers providing only two presentation channels, a degree of four-channel playback can be realized by using a matrix decoder, for example, provided the receiver can provide signals which are compatible for dematrixing. Unless special provisions are made, however, two-channel receivers provide only L/R channel signals which are not compatible with matrix decoding. Some additional processing is required to obtain compatible Lt/Rt signals.

In particular, compatibility with the MP-Matrix is desirable because of its wide use in motion picture soundtracks and its increasing use for encoding soundtracks carried on video cassette tapes. In addition, compatibility is desirable because a substantial number of existing consumer receivers contain MP-Matrix decoders. Preferably, the cost for providing matrix compatible signals should be low. Several methods are discussed below.

The examples recited throughout this discussion refer to four channels of audio information (L, R, C and S) and more particularly to the 4-2-4 MP-Matrix, but the principles discussed also apply to other matrixing methods and numbers of channels.

Receiver Downmixing

A receiver in a four-channel system can generate a type of Lt/Rt signals by mixing four channels according to any of several mixing equations, but they are not strictly MP-Matrix compatible. One simple set of equations is as follows:

$$Lt=L+0.707.C+0.707.S \qquad (2a)$$

$$Rt=R+0.707.C+0.707.S \qquad (2b)$$

The C and S channel signals are attenuated in the mix to preserve their original acoustic power.

The C channel is often used to carry dialogue and can be used to stabilize the apparent direction of sounds in front of the listener. The S channel, usually played back behind the listener, is often used to provide ambience and to create the illusion that various events are occurring around the listener.

Although the mixdown equations shown above do provide a two-channel compatible mix, they do not provide any phase information for S channel decoding. Furthermore, signals intended for the S channel are placed in the sound field overlapping the C channel signal, possibly obscuring the intelligibility of any dialogue. For this reason, S channel signals may be mixed at a reduced level, for example, as follows:

$$Lt=L+0.707.C+0.5.S \quad (3a)$$

$$Rt=R+0.707.C+0.5.S \quad (3b)$$

But like the previous equations do, these mixdown equations not provide the phase encoding needed by a decode MP-Matrix for proper S channel decoding.

A simple variation provides some phase coding by inverting the S channel component which is mixed into the Rt signal. The equations resulting from this variation are as follows:

$$Lt=L+0.707.C+0.707.S \quad (4a)$$

$$Rt=R+0.707.C-0.707.S \quad (4b)$$

This inversion creates a 180-degree phase shift used by the MP-Matrix for S channel decoding. When S channel signals are uncorrelated with the signals carried by the L/R channels, the S channel mix will not create any particular constructive/destructive interference with the front channels. In many applications, however, S channel signals are derived from the front channel signals. As a result, the L/R and S channel signals are correlated; when combined, the signals will tend to constructively add in the Lt signal and destructively cancel in the Rt signal. The resulting sound field will be unbalanced toward the left, and front/back panned effects will appear to move along an arc around the left side rather than along a line through the center as intended.

Other mixdown equations can be considered, but they all fail to produce Lt/Rt channel signals which are truly MP-Matrix compatible. When properly encoded, the Lt/Rt signals convey both gain and phase relationships which can be used to decode the S channel signal.

Two methods can provide MP-Matrix compatible signals in a multi-channel coding system, but each has disadvantages. The first method generates matrix compatible signals in the receiver, and the second method generates matrix compatible signals in the transmitter.

Receiver Matrix .Encoding

According to the first method, a four-channel receiver receives all four source channel signals and applies an encode MP-Matrix to the received signals to generate the Lt/Rt signals. Matrix encoding may be applied only when desired.

This method can avoid the cost of the matrix encoding process in receivers which do not provide matrix compatibility; however, the implementation costs for receivers which do provide compatibility may be significantly higher. As a result, manufacturers may be forced to build two versions of a receiver, a more expensive version providing compatibility and a less expensive version without compatibility.

The implementation costs for receivers providing matrix compatibility may be significantly higher because, in practical embodiments, signal synthesis processors must process all source channels before the desired 90-degree phase shift can be performed. As mentioned above, the techniques set forth in publication WO 92/12608 allow implementation costs of receivers to vary in proportion to the number of presentation channels which are decoded; therefore, for many preferred embodiments of split-band coding systems, this method eliminates the possibility of a lower-cost matrix-compatible two-channel receiver, for example.

Regardless of embodiment, however, the additional processing required to perform phase shifts adds to the implementation costs of a receiver. It is preferable to shift the cost of performing this processing to transmitters because, in many applications, receivers are far more numerous than transmitters. This situation is readily apparent in applications such as radio and television broadcasting, and distribution of recording media such as tapes, records and optical discs.

Transmitter Matrix Encoding

According to the second method, a four-channel transmitter uses 4-4 matrix encoding and phase shifting to encode four source channels (L, R, C and S) into the Lt/Rt signals plus two "helper" signals, A and B. An example of one 4-4 matrix encoder is as follows:

$$Lt=L+0.707.C+0.707.jS \quad (5a)$$

$$Rt=R+0.707.C-0.707.jS \quad (5b)$$

$$A=C \quad (5c)$$

$$B=S \quad (5d)$$

where j=denotes a phase shift of 90 degrees. Many other 4-4 matrix encoders are possible; for example, the helper signals may be the L and R channel signals.

The encoded signal is compatible with MP-Matrix decoders as well as two- and four-channel receivers. The Lt/Rt signals may be decoded directly by an MP-Matrix decoder into four presentation channels (L', R', C' and S'). The Lt/Rt signals are also compatible with one- and two-channel playback in the same sense as that discussed above for MP-Matrix compatibility.

A four-channel receiver receives the four signals Lt, Rt, A and B, and uses a 4-4 matrix decoder to recover the four source channels. A 4-4 matrix decoder compatible with the encoder shown above is as follows:

$$L=Lt-0.707.A-0.707.jB \quad (6a)$$

$$R=Rt-0.707.A+0.707.jB \quad (6b)$$

$$C=A \quad (6c)$$

$$S=B \quad (6d)$$

Additional information for different embodiments of compatible matrixing with helper signals may be obtained by referring to U.S. Pat. No. 4,577,305, which is incorporated herein by reference in its entirety.

A receiver must perform matrix decoding to recover the source channel signals because Lt/Rt signals are transmitted rather than L/R channel signals. The additional processing required by a receiver to recover the source channels is undesirable because it increases implementation costs. In particular, the receiver must still perform phase-shift processing because the B signal must be shifted in phase by 90 degrees to accurately recover the L/R channel signals.

This additional processing may also adversely affect the transparency of the coding process as a result of two different mechanisms. Arithmetic errors such as round-off errors is one mechanism which injects noise-like components into a signal. In general, any arithmetic process may degrade the quality of a digital signal. A second mechanism pertains to psychoacoustic effects. Generally speaking, the encoding of signals according to psychoacoustic principles controls the amount of quantizing noise of the encoded signal such that the quantizing noise is just masked by the signal's spectral components. Matrix decoding can result in one or more signals with a controlled amount of quantizing noise but having very little spectral energy to mask it. This known effect is sometimes referred to as "decoder unmasking."

Transmitter matrix encoding will become even less attractive in the future as increasing numbers of playback systems with three or more channels become available and fewer matrix decoder systems remain.

DISCLOSURE OF INVENTION

It is an object of the present invention to provide for a multi-channel coding system whose presentation channel signals are essentially indistinguishable from its source channel signals, and whose output signals are compatible with conventional matrix decoders such as MP-Matrix decoders, but which minimizes the complexity and implementation costs required to achieve the compatibility. Presentation channel signals are said to be essentially indistinguishable from source channel signals when the sound field generated by a playback system in response to the presentation channel signals is essentially indistinguishable from the sound field that could be generated by the same playback system in response to the source channel signals.

In accordance with the teachings of the present invention in one embodiment of a transmitter, four source channel signals are assembled into an encoded signal which includes a 90-degree phase shift for one of the channels.

In accordance with the teachings of the present invention in one embodiment of a receiver, four channels of information are recovered from an encoded signal. The recovered information may be combined as desired using relatively inexpensive processes to generate signals compatible with MP-Matrix decoders. Otherwise, the recovered information is essentially indistinguishable from the information conveyed in the source channels; thus, the recovered signals are compatible with both multi-channel playback systems and MP-Matrix decoders.

In accordance with the teachings of the present invention in another embodiment of a receiver, two matrix-encoded Lt/Rt signals and two helper signals are recovered from an encoded signal. The recovered Lt/Rt signals are used directly for MP-Matrix decoding, or they may be combined with the helper signals using relatively inexpensive processes to generate signals intended for multi-channel playback systems. The recovered signals are essentially indistinguishable from the source channel signals; thus, the recovered signals are compatible with both multi-channel playback systems and MP-Matrix decoders.

Many variations are possible. Multi-channel coding systems incorporating the present invention are not limited to four channels. For example, the L/R channel signals may convey correlated signal components which, when reproduced, create a center image as is common in conventional two-channel playback systems; hence, no C channel is required. The phase shift may be accomplished using a number of methods such as applying two types of all-pass filters to the source signals, or by applying a Hilbert transform to only the source signals requiring the phase shift. It should be understood that a 90-degree phase shift is ideal for certain encoder/decoder matrixes such as the MP-Matrix, but the present invention is applicable to coding requiring phase shifts of various angles. The transmitter may optionally include an indication in the encoded signal of the presence and/or amount of phase shifts; a receiver may optionally provide matrix decoder compatibility when such an indication is present in the encoded signal. Additional variations are discussed below, and other variations will be apparent to those skilled in the art.

The embodiments discussed herein and shown in the accompanying drawings are given by way of example and should not be interpreted as limitations upon the scope of the present invention.

MODES FOR CARRYING OUT THE INVENTION

Basic Structure

Figure 1:
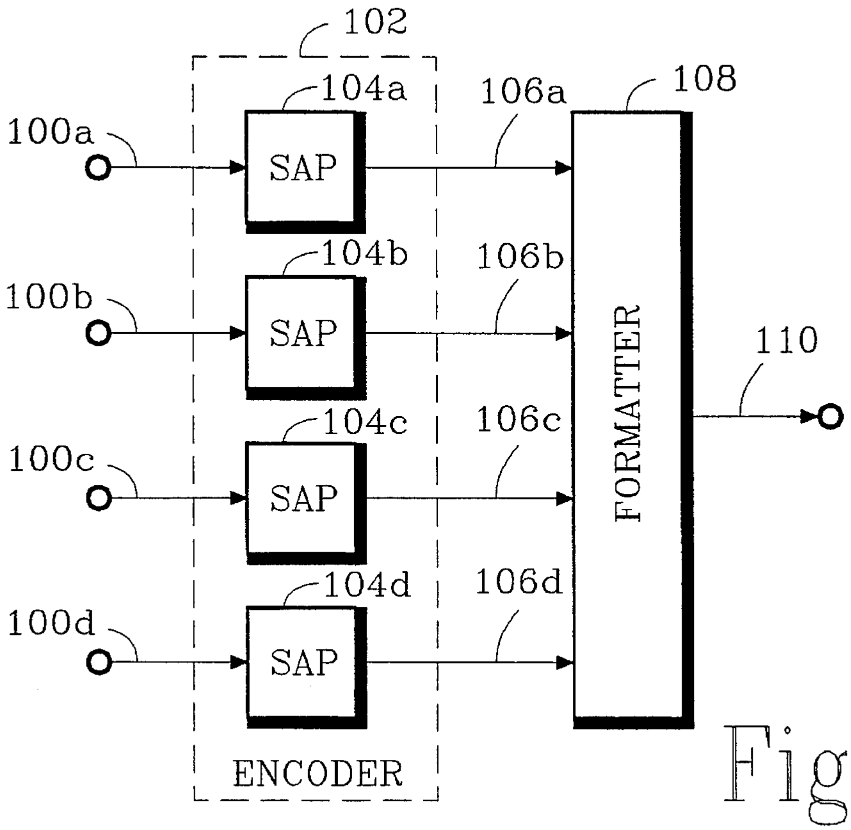
FIG. 1 is a block diagram illustrating the basic structure of a multi-channel transmitter.

The basic structure of a multi-channel transmitter is illustrated in FIG. 1. Encoder 102 receives four source channel signals from paths 100*a*–100*d*. Each signal is processed by a respective signal analysis processor 104*a*–104*d*, and the results of the analysis are sent along respective paths 106*a*–106*d* to formatter 108. Formatter 108 assembles the processed signals into an encoded signal suitable for transmission or storage, and passes the encoded signal along transmission path 110.

Figure 2:
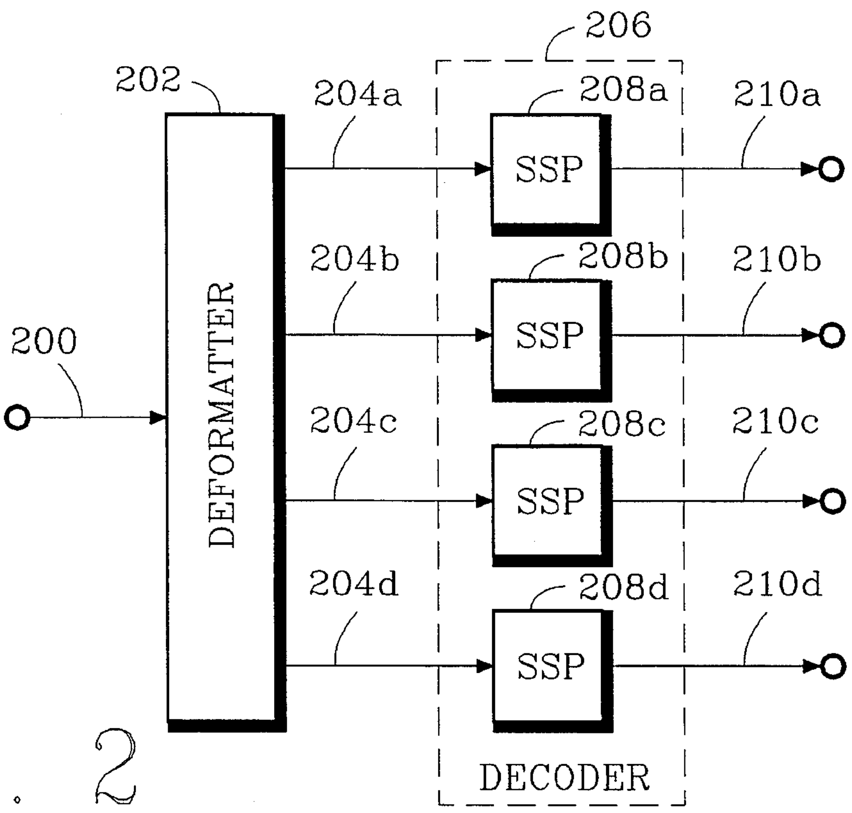
FIG. 2 is a block diagram illustrating the basic structure of a multi-channel receiver.

The basic structure of a multi-channel receiver is illustrated in FIG. 2. Deformatter 202 receives an encoded signal from path 200 and extracts from the encoded signal four extracted signals which it passes along respective paths 204*a*–204*d* to decoder 206. Each extracted signal is processed by a respective signal synthesis processor 208*a*–208*d*, and the results of the synthesis are passed along a respective presentation channel 210*a*–210*d*.

A multi-channel coding system may comprise a transmitter according to the structure of FIG. 1 and a receiver according to the structure of FIG. 2. The implementation cost of the coding system is approximately proportional to the total number of signal analysis and signal synthesis processors. As discussed above, a lower-cost receiver may be implemented with only two channels. One embodiment of a two-channel receiver comprises deformalter 202 and decoder 206 with signal synthesis processors 208*a* and 208*b* which generate output signals along presentation channels 210*a* and 210*b*, respectively. This two-channel embodiment has an implementation cost of approximately one-half that of a comparable four-channel receiver, but it does not provide presentation channel signals which are compatible with matrix decoders such as an MP-Matrix decoder.

Matrix Encoding

Receiver

Figure 3:
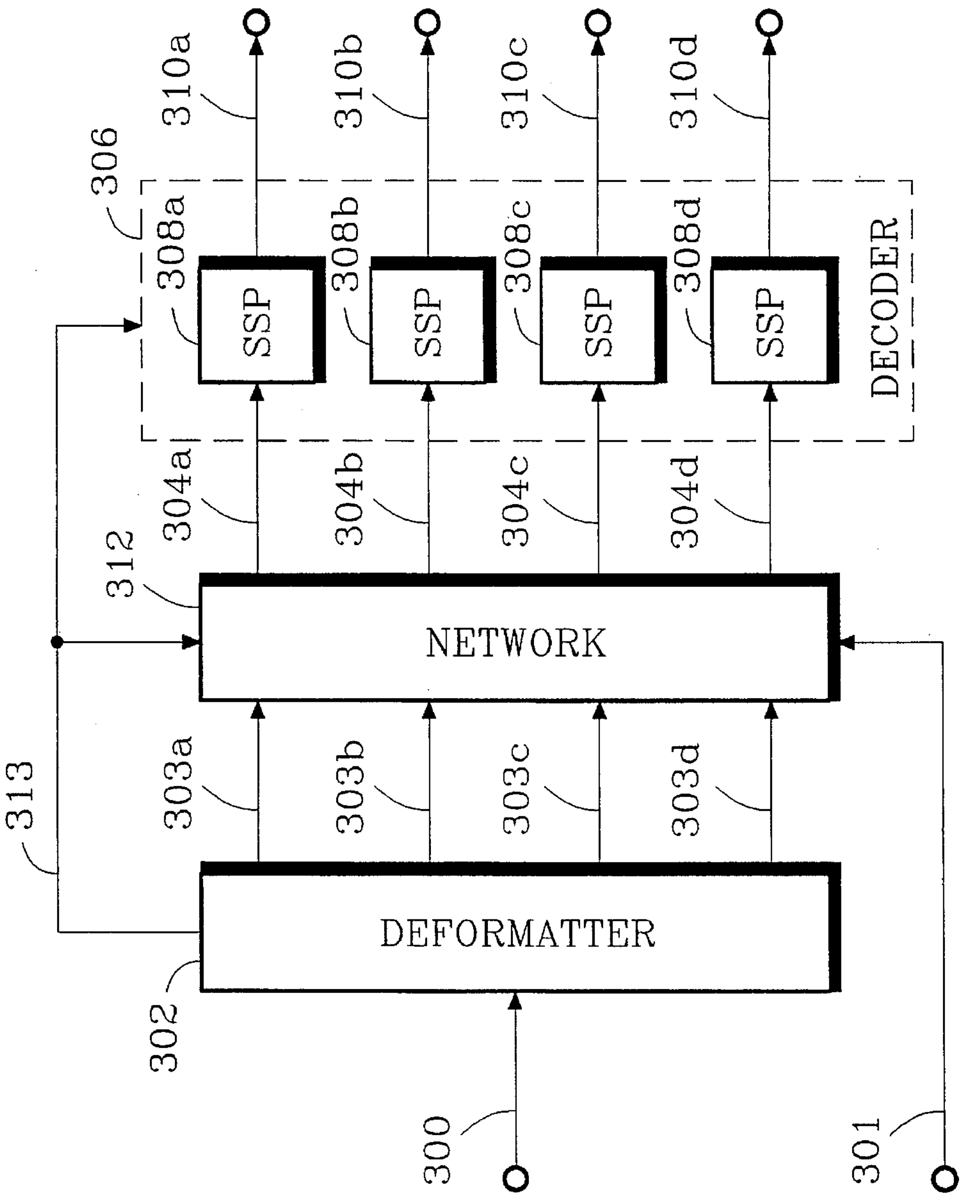
FIG. 3 is a block diagram illustrating the basic structure of one embodiment of a multi-channel receiver which may incorporate various aspects of the present invention.

FIG. 3 illustrates the basic structure of another embodiment of a multi-channel receiver. Deformalter 302 receives an encoded signal from path 300 and extracts from the encoded signal four extracted signals which it passes along respective paths 303*a*–303*d* to network 312. Network 312 processes the extracted signals into four intermediate signals and passes the intermediate signals along paths 304*a*–304*d* to decoder 306. Each intermediate signal is processed by a respective signal synthesis processor 308*a*–308*d*, and the results of the synthesis are passed along a respective presentation channel 310*a*–310*d*. Signal paths 301 and 313 are not used in this embodiment and need not be present.

In another embodiment, network 312 adapts its processing in response to an indication which it receives from path 301. For example, an operator may specify the network process by means of a switch.

A multi-channel coding system may comprise a transmitter according to the structure of FIG. 1 and a receiver according to either embodiment just described. A two-channel receiver may comprise deformalter 302, network 312, and decoder 306 with signal synthesis processors 308*a* and 308*b* which generate output signals along presentation channels 310*a* and 310*b*, respectively. The receiver can provide limited compatibility with an MP-Matrix decoder by applying mixing equations in network 312 such as those in equations 2a–4b, discussed above. The problems inherent with this approach are also discussed above.

Transmitter

Figure 4:
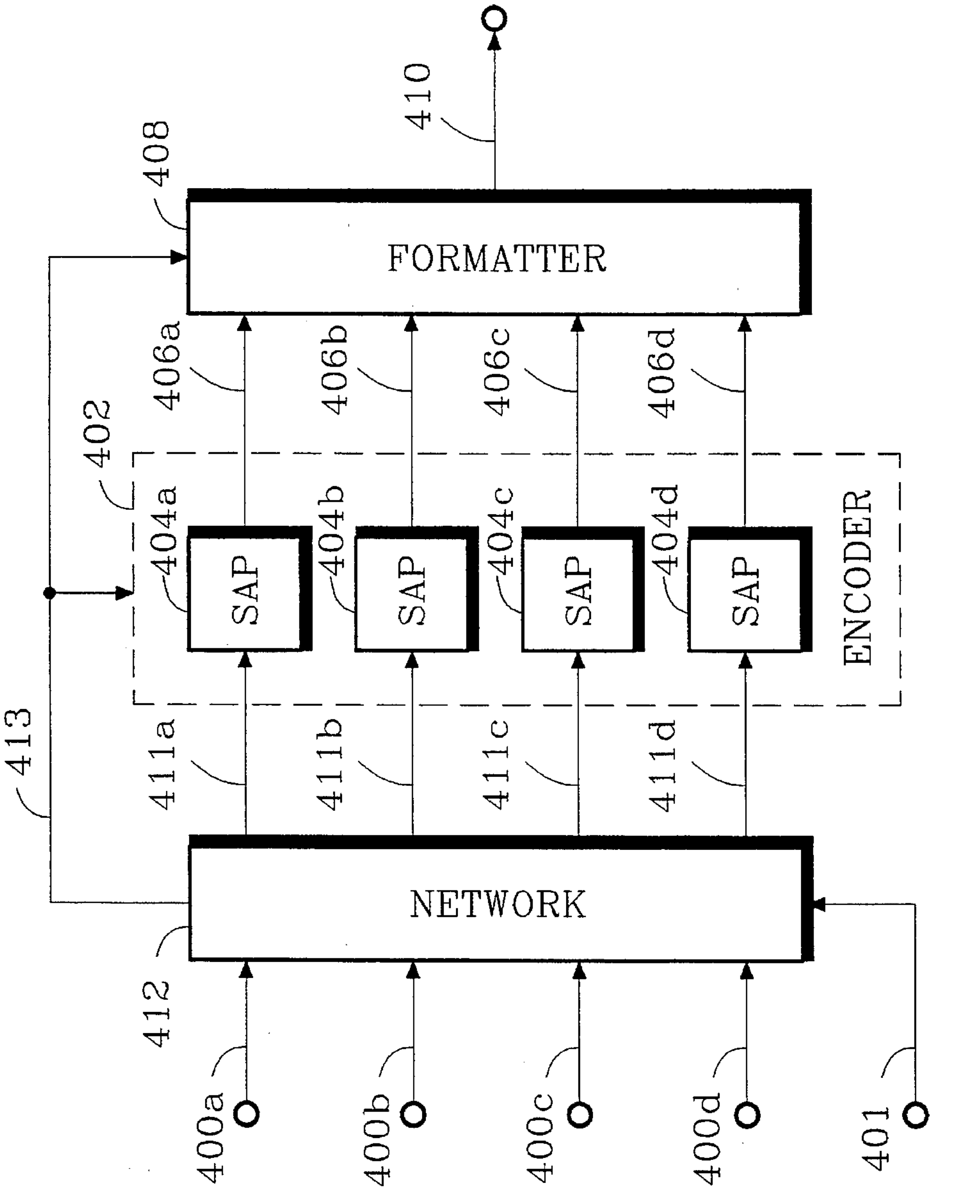
FIG. 4 is a block diagram illustrating the basic structure of one embodiment of a multi-channel transmitter which may incorporate various aspects of the present invention.

FIG. 4 illustrates the basic structure of another embodiment of a multi-channel transmitter. Network 412 receives four source channel signals from paths 400*a*–400*d* and processes them into four intermediate signals which it passes along respective paths 411*a*–411*d* to encoder 402. Each intermediate signal is processed by a respective signal analysis processor 404*a*–404*d*, and the results of the analysis are sent along respective paths 406*a*–406*d* to formatter 408. Formatter 408 assembles the processed signals into an encoded signal suitable for transmission or storage, and passes the encoded signal along transmission path 410. Signal paths 401 and 413 are not used in this embodiment and need not be present.

In another embodiment, network 412 adapts its processing in response to an indication which it receives from path 401. For example, an operator may specify the network process by means of a switch.

A multi-channel coding system may comprise a transmitter according to either embodiment just described and a receiver according to any of the embodiments described above in relation to FIG. 3. As discussed above, the transmitter can provide for compatibility with an MP-Matrix decoder by applying a 4-4 encode matrix in network 412. In this embodiment, network 412 receives L, R, C and S channel signals from paths 400*a*–400*d* and matrixes them into two Lt/Rt channel signals, which are MP-Matrix compatible, and two additional "helper" channel signals, denoted as A and B, all of which are passed along respective paths 411*a*–411*d* to encoder 402. The four channel signals (Lt, Rt, A and B) generated by the matrix are passed in the encoded signal to a receiver. Equations 5a–5d provide one example of a suitable encode matrix. The problems inherent with this approach are discussed above.

Transmitter/Receiver

In one embodiment of a transmitter according to FIG. 4, network 412 encodes the Lt, Rt and helper channel signals according to the following encode matrix:

$$Lt=L+0.707.C+0.707.jS \quad (7a)$$

$$Rt=R+0.707.C-0.707.jS \quad (7b)$$

$$A=C \quad (7c)$$

$$B=jS \quad (7d)$$

Figure 7:
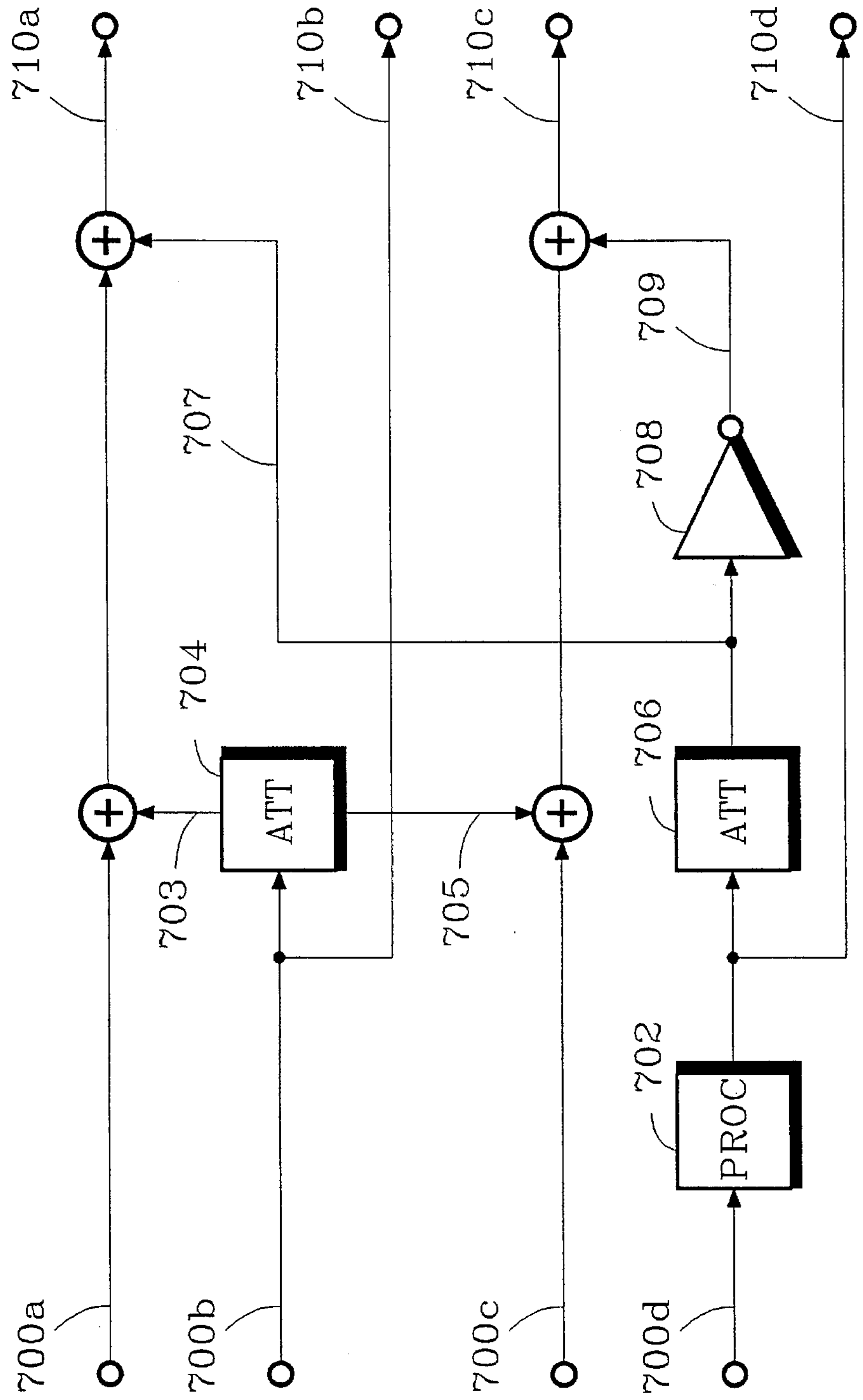
FIG. 7 is a schematic diagram illustrating one embodiment of a 4—4 encoding matrix providing two MP-Matrix decoder compatible signals and two helper signals.

FIG. 7 illustrates one embodiment of this encode matrix. The C channel signal is received from path 700*b* is passed along attenuator 704 path 710*b* as a helper signal and is passed to where it is attenuated to one-half power and passed along paths 703 and 705. The S channel signal is received from path 700*d*, and shifted in phase by 90 degrees in processor 702. The phase-shifted signal is passed along path 710*d* as a helper signal and passed to attenuator 706 which attenuates it to one-half power. The phase-shifted and attenuated signal is passed along path 707 and passed to inverter 708 which obtains a 180 degree phase shift by inverting the signal amplitude. The L channel signal is received from path 700*a*, combined with the attenuated C channel signal and with the phase-shifted/attenuated S channel signal, and passed along path 710*a* as the Lt signal. The R channel signal is received from path 700*c*, combined with the attenuated C channel signal and with the phase-shifted/attenuated/inverted S channel signal, and passed along path 710*c* as the Rt signal.

In one embodiment of a receiver according to FIG. 3, the four channel signals (Lt, Rt, A and B) are extracted from the encoded signal received from path 300. The Lt/Rt signals are matrix compatible. The four source channel signals may be recovered in the receiver from the encoded signal according to the following decode matrix:

$$L=Lt-0.707.A-0.707.B \quad (8a)$$

$$R=Rt-0.707.A+0.707.B \quad (8b)$$

$$C=A \quad (8c)$$

$$S=-jB \quad (8d)$$

The basic components illustrated in FIG. 7 may be combined in appropriate ways to implement this decode matrix as well as other encode/decode matrixes discussed herein.

In a split-band coding system, for example, all of the decode matrix operations except for the phase shift can be performed inexpensively in the frequency domain prior to synthesis filtering. For example, in a transform coding system, two digital signals may be combined in the frequency domain by adding or subtracting respective transform coefficient in each of the two signals. In a digital subband coding system, signals may be combined in the frequency domain by adding or subtracting corresponding samples in respective subband signals. This means that a one-, two- or three-channel (L, R, and C) receiver can be implemented at a cost which is approximately proportional to the number of presentation channels rather than the number of source channels.

The phase shift needed to recover the S channel signal is a more expensive operation than the other matrixing operations, but it need not be performed unless an exact recovery of the S channel signal is required. In many applications, however, the 90-degree phase shift in the S channel signal will generally be inaudible.

Figure 5:
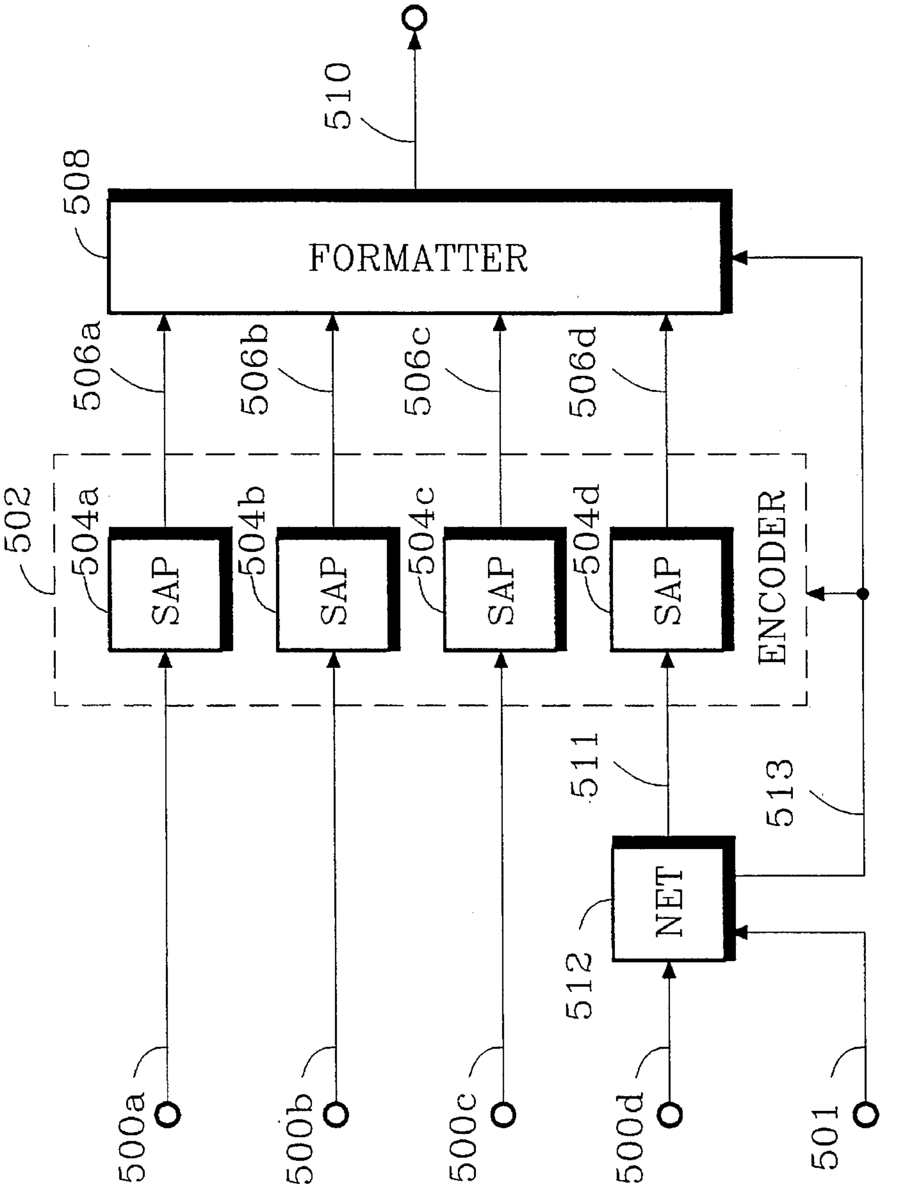
FIG. 5 is a block diagram illustrating the basic structure of another embodiment of a transmitter incorporating various aspects of the present invention.

In one embodiment of a transmitter according to FIG. 5, network 512 shifts the phase of the S channel signal received from path 500*d*. Encode 502 receives the phase-shifted S channel signal from path 511 and the other three source channel (L, R and C) signals from a respective path 500*a*–500*c*, processes each signal by a respective signal analysis processor 504*a*–504*d*, and passes the results of the signal analysis along a respective path 506*a*–506*d* to formatter 508. Formatter 508 assembles the processed signals into an encoded signal suitable for transmission or storage, and passes the encoded signal along transmission path 510. Paths 501 and 513 are not used in this embodiment and need not be present.

The following equations represent the encode matrix:

$$L=L \quad (9a)$$

$$R=R \quad (9b)$$

$$A=C \quad (9c)$$

$$B=jS \quad (9d)$$

In another embodiment, network 512 adapts its processing characteristics in response to an indication received from path 501. For example, network 512 may adjust the amount of phase shift in response to an operator-actuated control.

In one embodiment of a receiver according to FIG. 2, the four channel signals (L, R, A and B) are received in an encoded signal from path 300. Except for the 90-degree phase shift in the B signal, the four received signals correspond exactly with each of the four source channel signals. As mentioned above, however, this phase shift is generally inaudible in many applications. If the S channel signal must be recovered accurately, an embodiment of a receiver according to FIG. 3 can perform the required phase shift in network 312.

If decode MP-Matrix compatible signals are desired, a two-channel receiver according to the structure shown in FIG. 3 can obtain them by applying the following encode matrix in network 312:

$$Lt=L+0.707.A+0.707.B \quad (10a)$$

$$Rt=R+0.707.A-0.707.B \quad (10b)$$

Figure 6:
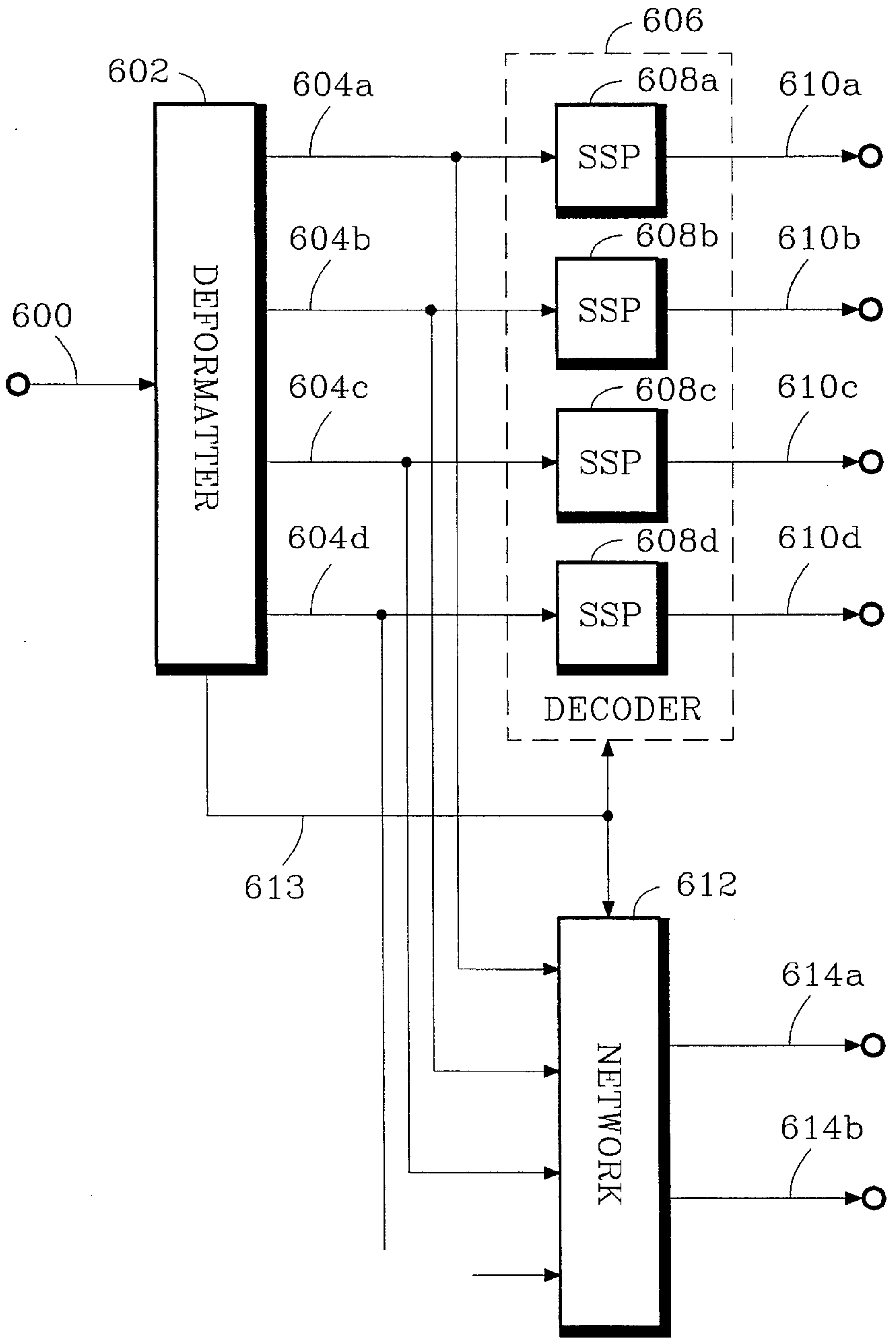
FIG. 6 is a block diagram illustrating the basic structure of another embodiment of a receiver incorporating various aspects of the present invention.

An embodiment of a receiver according to FIG. 6 may provide multi-channel compatible signals and decode matrix compatible signals. Deformatter 602 receives an encoded signal from path 600 and extracts from the encoded signal four extracted signals which it passes along respective paths 604*a*–604*d* to decoder 606 and to network 612. A respective signal synthesis processor 608*a*–608*d* processes the four extracted signals and passes the results along a respective path 610*a*–610*d*. Network 612 applies the encode matrix equations 10a–10b to the four extracted signals to generate two intermediate signals which it passes along a respective path 614*a*–614*b*. Signal path 613 is not used in this embodiment and need not be present.

In another embodiment, an indication is extracted from the encoded signal and passed along path 613. Decoder 606 and/or network 612 adapt processing characteristics in response to the indication received from path 613. For example, the indication may specify whether four-channel output or two-channel matrix compatible output is to be provided.

In some embodiments, the signals passed along paths 614*a*–614*b* are not the Lt/Rt signals required for matrix compatibility. Generally, signal synthesis processing is required to obtain these Lt/Rt signals. This signal synthesis processing may be performed by processors not shown in FIG. 6, or it may be performed by a respective two processors 608*a*–608*d* within decoder 606 using signal paths not shown in FIG. 6. The routing of signals to the signal processors may be accomplished in response to an indication received from path 613, for example, or in response to an operator request along a path not shown in FIG. 6.

The various embodiments of receivers according to structures shown in FIGS. 3 and 6 may apply an encode matrix with mixing equations which differ slightly from those shown in equations 10a–10b as follows:

$$Lt=L+0.707.A+0.707.B-\chi.R \quad (1a)$$

$$Rt=R+0.707.A-0.707.B-\chi.L \quad (11b)$$

Matrix encoding tends to collapse sound field images. In comparison to the sound fields generated by multiple discrete channel signals, the sound fields generated by multiple channel signals that have been subjected to matrix encoding and decoding appear to be grouped toward the center of the field. Matrix processing tends to reduce the spatial breadth of a sound field. In order to partially counteract this effect, the mixing equations shown in 11a–11b reduce the level of signal components common to the L/R channel signals. The amount of the reduction is controlled by the value of the $\chi$ coefficient. A typical value is 0.25. In some embodiments, this coefficient may be adjusted in response to an indication received in the encoded signal, or in response to an indication generated at the receiver by an operator actuated control. In an embodiment according to the structure shown in FIG. 3, for example, this indication may be received from path 301.

Adaptive Processing

In yet another embodiment of a transmitter according to FIG. 4, network 412 may adapt its processing in response to various signal characteristics detected in the source channel signals and/or in response to an indication received from path 401. For example, network 412 in a psychoacoustic-based transmitter/encoder may adaptively turn off matrix encoding in response to detecting little or no spectral energy in either the L or R channel signals. In conjunction with a complementary adaptive receiver, decoder unmasking could be avoided. An indication of the network process actually used is passed along path 413 to formatter 408 which assembles the indication into the encoded signal.

In addition, encoder 402 may adapt its processing in response to the indication received from path 413. For example, the indication may inform encoder 402 which channels to process.

An embodiment of a transmitter according to FIG. 5 may adapt is operation in a manner similar to that just described for the embodiment illustrated in FIG. 4.

In yet another embodiment of a receiver according to FIG. 3, deformatter 302 extracts from the encoded signal an indication of the network process used to prepare the encoded signal. Network 312 and/or decoder 306 adapt their processing in response to the indication received from path 3 13. For example, the indication extracted from the encoded signal may inform network 312 which of several matrixing equations to use and/or inform decoder 306 which channels to process.

Split-band Coding Implementations

Transmitter

In one embodiment of a transmitter utilizing split-band coding techniques, each signal analysis processor **104*a*–104*d*** comprises an analysis filter bank and an adaptive quantizer. The analysis filter bank generates subband signals representing frequency subbands of a respective source channel signal, and the adaptive quantizer quantizes the subband signals using a number of bits allocated according to psychoacoustic principles. Details of implementation for the analysis filter bank and quantizer are not critical to the practice of the present invention. Many different implementations may be used. For example, implementations of a subband coder and a transform coder are more fully disclosed in U.S. Pat. Nos. 4,896,362 and 5,109,417, respectively, which are incorporated herein by reference in their entirety.

In another embodiment utilizing split-band coding techniques, each signal analysis processor **104*a*–104*d* comprises an analysis filter bank for generating subband signals, and encoder 102** comprises an adaptive quantizer which jointly quantizes the subband signals generated by all the synthesis filter banks according to psychoacoustic principles. By jointly quantizing subband information for all the channels, various inter-channel masking effects may be more easily exploited. Details of implementation are not critical to the practice of the present invention. Many different implementations may be used. For example, implementations of cross-channel coding are more fully disclosed in WIPO publication WO 92/12607, referred to above, and in U.S. Pat. No. 4,555,649 and European Patent Office publication EP 0 402 973, which are incorporated herein by reference in their entirety.

These embodiments also apply to the structures illustrated in FIGS. 4 and 5.

Receiver

In one embodiment of a receiver utilizing split-band coding techniques, each signal synthesis processor **208*a*–208*d* comprises a dequantizer and a synthesis filter bank. The dequantizer dequantizes a respective intermediate signal into subband signals using the same number of bits used by a transmitter to quantize the information, and the synthesis filter bank generates presentation signals along a respective presentation channel 210*a*–210*d*** in response to the subband signals. Details of implementation for the synthesis filter bank and dequantizer are not critical to the practice of the present invention. Many different implementations may be used.

In another embodiment utilizing split-band coding techniques, each signal synthesis processor **208*a*–208*d* comprises a synthesis filter bank for generating presentation signals, and decoder 206 comprises a dequantizer which dequantizes all of the intermediate signals extracted by deformatter 202**. Details of implementation are not critical to the practice of the present invention. Many different implementations may be used.

These embodiments also apply to the structures illustrated in FIGS. 3 and 6.

Selected Subbands

In a split-band coding system, the combining operations of an encode or decode matrix can be performed inexpensively in the frequency domain. Furthermore, these operations can be confined to selected subbands. For example, in a split-band coding system comprising a transmitter and a receiver, the transmitter may apply an encode matrix to adaptively selected subbands and pass an indication of the selection in the encoded signal. Matrix encoding might be used as a means for reducing the number of bits required to encode source channel signals during intervals when more bits are required to encode all of the source channel signals individually than are otherwise available. In response to the indication extracted from the encoded signal, a four-channel receiver could adaptively apply a decode matrix to the appropriate subbands. One embodiment of the transmitter differs from that shown in FIG. 4, for example, in that the matrix encoding function is interposed between encoder 402 and formatter 408.

The transmitted signal encoded in this manner could also provide a degree of compatibility with a two-channel receiver which is not responsive to the indication of subband selection. The two presentation channel signals derived from the encoded signal would convey the spectral energy of the L/R channel signals in lower-frequency subbands, for example, and convey the spectral energy of the Lt/Rt signals in higher-frequency subbands.

Alternative Embodiments

The embodiments discussed above which illustrate various aspects of the present invention make more particular mention of four-channel systems having L, R, C and S channels. Discussion of matrix encoding and decoding has made more particular mention of the MP-Matrix. The present invention is not limited to any specific number of channels or to any specific encode/decode matrix. These embodiments have been set forth by way of example only. The scope of the present invention may be appreciated by reference to the following claims.

I claim:

1. A system for processing multiple channels of audio information, said system comprising a transmitter comprising first networking means for generating intermediate signals by changing the phase of information received from one or more of said multiple channels of audio information relative to the phase of information received from another of said multiple channels of audio information, wherein said changing phase effects changes in phase not equal to 180 degrees, encoding means responsive to said first networking means for generating subband signals representing frequency subbands of said intermediate signals, and formatting means for assembling said subband signals into an encoded signal suitable for transmission or storage; and a receiver comprising deformatting means for receiving said encoded signal and for extracting recovered subband signals therefrom, second networking means for combining, in one or more subbands, said recovered subband signals corresponding to at least two of said multiple channels of audio information, and decoding means responsive to said second networking means for generating recovered audio information.

2. A system according to claim 1 wherein said first networking means effects a relative phase change substantially equal to ninety degrees.

3. A system according to claim 2 wherein said first networking means comprises means for applying a Hilbert transform.

4. A system according to claim 1 wherein said first networking means comprises means for effecting a phase change for information corresponding to all of said multiple channels.

5. A system according to claim 4 wherein said first networking means effects a relative phase change substantially equal to ninety degrees.

6. A system according to claim 1, 2 or 4 wherein said second networking means combines recovered subband signals substantially according to the mixing equations of an encode MP-Matrix having only real-valued coefficients.

7. A system according to claim 1 wherein said encoding means generates said subband signals by applying a bank of band-pass filters, and wherein said decoding means generates said recovered audio information by applying a bank of inverse band-pass filters.

8. A system according to claim 1 wherein said encoding means generates said subband signals by applying a discrete transform, and wherein said decoding means generates said recovered audio information by applying an inverse discrete transform.

9. A system according to claim 1 wherein said transmitter further comprises means for receiving an indication signal, wherein said first networking means and/or said encoding means adapts its operating characteristics in response to said indication signal.

10. A system according to claim 9 wherein said indication signal is generated by an operator actuated control.

11. A system according to claim 1 wherein said receiver further comprises means for receiving an indication signal, wherein said second networking means and/or said decoding means adapts its operating characteristics in response to said indication signal.

12. A system according to claim 11 wherein said indication signal is generated by an operator actuated control and/or is generated in response to information extracted from said encoded signal.

13. A transmitter for processing multiple channels of audio information comprising encoding means for generating subband signals representing frequency subbands of said multiple channels of audio information, networking means responsive to said encoding means for generating intermediate signals by changing the phase of one or more subband signals corresponding to one or more of said multiple channels of audio information, wherein said phase is changed relative to the phase of subband signals corresponding to another of said multiple channels of audio information by an amount not equal to 180 degrees, and formatting means for assembling said intermediate signals into an encoded signal suitable for transmission or storage.

14. A transmitter according to claim 13 wherein said audio information comprises signal samples, said encoding means generates said subband signals by applying a digital filter to said multiple channels of audio information, and said network means applies a Hilbert transform to said one or more subband signals.

15. A method for processing multiple channels of audio information, said method comprising generating intermediate signals by changing the phase of information received from one or more of said multiple channels of audio information relative to the phase of information received from another of said multiple channels of audio information, wherein said changing phase effects changes in phase not equal to 180 degrees, generating subband signals representing frequency subbands of said intermediate signals, and assembling said subband signals into an encoded signal suitable for transmitting or storing.

16. A method according to claim 15 wherein said subband signals are generated by applying a bank of band-pass filters to said intermediate signals.

17. A method according to claim 15 wherein said subband signals are generated by applying a discrete transform to said intermediate signals.

18. A method according to claim 15 wherein said generating intermediate signals effects a relative phase change substantially equal to ninety degrees.

19. A method according to claim 15 further comprising a step of receiving an indication signal and adapting the generation of said subband signals and/or said intermediate signals in response to said indication signal.

20. A system for processing multiple channels of audio information, said system comprising a transmitter comprising a phase-change network coupled to one or more channels of said multiple channels of audio information, wherein said phase-change network effects a phase change substantially equal to ninety degrees, a split-band coder coupled to said phase-change network, a multiplexor coupled to said split-band coder; and a receiver responsive to a signal transmitted by said transmitter, said receiver comprising a demultiplexor, and a split-band decoder coupled to said demultiplexor.

21. A system according to claim 20 wherein said receiver further comprises a matrixing network coupled to said split-band decoder which substantially conforms to an encode MP-Matrix with only real-valued coefficients.

22. A system according to claim 20 wherein said receiver further comprises a matrixing network interposed between said demultiplexor and said split-band decoder, wherein said matrixing network substantially conforms to an encode MP-Matrix with only real-valued coefficients.

23. A system according to claim 20 wherein said split-band coder comprises a bank of band-pass filters, and wherein said split-band decoder comprises a bank of inverse band-pass filters.

24. A system according to claim 20 wherein said split-band coder applies a discrete transform, and wherein said split-band decoder applies an inverse discrete transform.

25. A system according to claim 20 wherein said matrixing network and/or said split-band decoder adapt operating characteristics in response to a signal which is generated by said demultiplexor and/or received by an input terminal.

* * * * *

UNITED STATES PATENT AND TRADEMARK OFFICE
CERTIFICATE OF CORRECTION

PATENT NO. : 5,463,424
DATED : 10/31/95
INVENTOR(S) : Roger W. Dressler

It is certified that error appears in the above-identified patent and that said Letters Patent is hereby corrected as shown below:

Column 3 line 47 of the patent, add a --.-- after the word "transforms";

Column 8 line 67 of the patent, "deformalter" should be --deformatter--;

Column 9 line 12 of the patent, "deformalter" should be --deformatter--;

Column 9 line 31 of the patent, "deformalter" should be --deformatter--.

Signed and Sealed this

Sixth Day of January, 1998

Attest:

Bruce Lehman

BRUCE LEHMAN

*Attesting Officer* *Commissioner of Patents and Trademarks*